Patented Mar. 29, 1927.

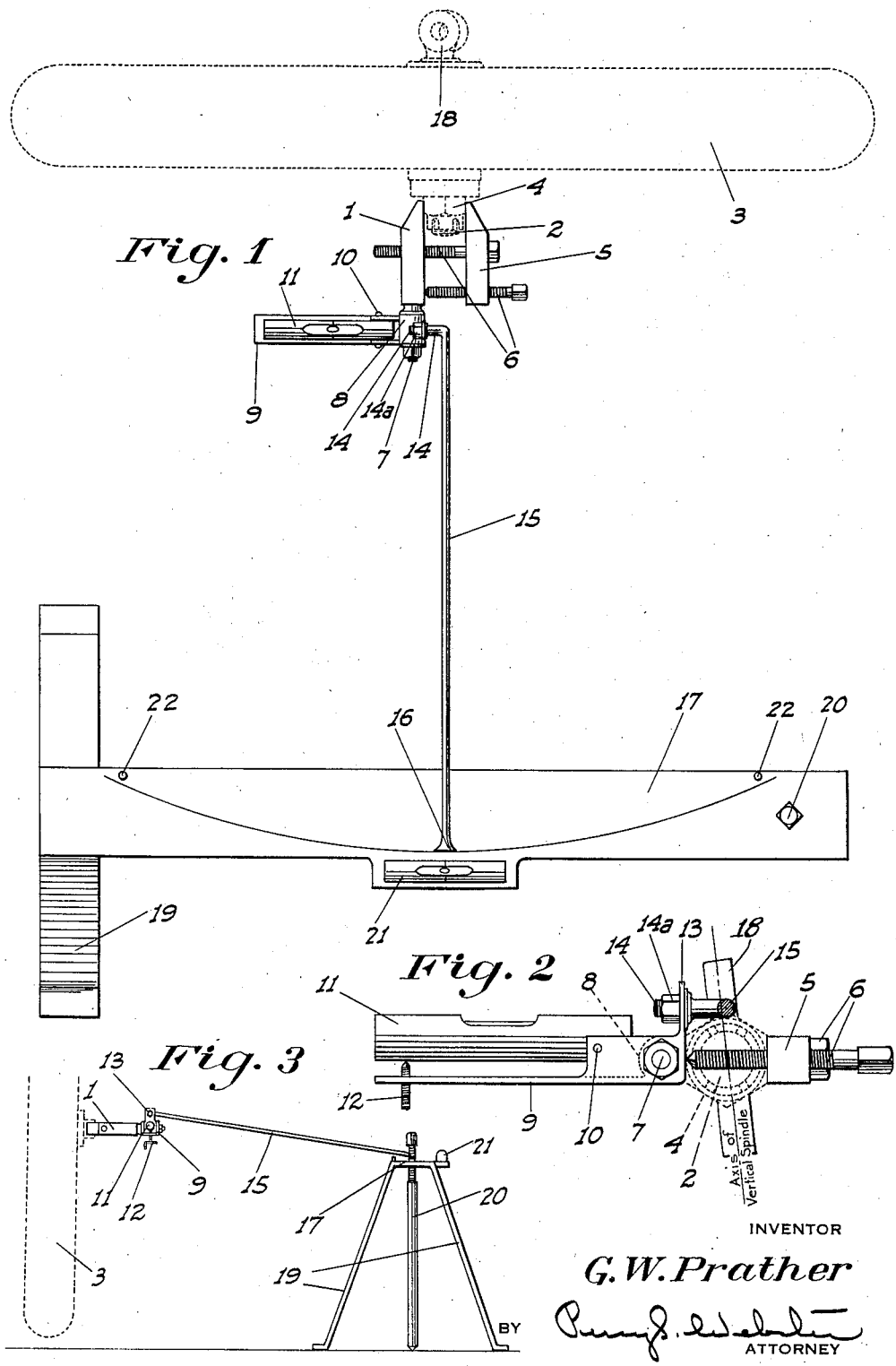

1,622,342

UNITED STATES PATENT OFFICE.

GEORGE W. PRATHER, OF SANTA CRUZ, CALIFORNIA.

DEVICE FOR TESTING KNUCKLE-PIN CASTERS.

Application filed July 13, 1926. Serial No. 122,151.

This invention relates to improvements in means and methods of testing front wheel spindles of motor vehicles for caster or vertical slant in a longitudinal plane, my principal object being to provide a device for readily ascertaining such slant without taking off a wheel of the vehicle or removing the axle, and for correcting any excessive or deficient slant which may have been found by test to exist in the pin.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan view of my apparatus as applied in connection with the front wheel spindle of an automobile and ready for use.

Fig. 2 is a side elevation of the testing device with the gage rod broken off and the gage table removed.

Fig. 3 is a rear view looking forward of the complete apparatus as applied to a front wheel spindle.

Referring now more particularly to the characters of reference on the drawings, the numeral 1 denotes a rigid horizontal arm adapted to extend longitudinally of the horizontal wheel spindle 2 of a front wheel 3, and to abut against one face of the usual nut 4 on the outer end of the spindle. Opposite to the arm 1 is an independent arm 5 to engage the opposite face of the nut and connected to the arm 1 by suitable disposed clamping bolts 6, so that the members 1 and 5 may be removably clamped onto said nut.

The outer end of the arm 1 is formed as a spindle 7 which is adjustably clamped in a bearing sleeve 8 formed on one end of a frame 9 which extends transversely of the arm 1 or substantially parallel to the wheel 3. Extending longitudinally of the frame 1 and turnably mounted thereon on a pin 10 disposed parallel to said arm 1 is a spirit level 11 of ordinary form. The slope of this level relative to the frame 9 is adjusted by a set screw 12 threaded through the frame and engaging the level, the threads of this screw having a predetermined pitch relative to certain other features of the apparatus, as will be hereinafter set forth.

Projecting upwardly from the frame 9 adjacent the sleeve 8 is a lug 13 in which is turnably mounted a stub spindle 14 extending in a plane parallel to the wheel 3 and adapted to be adjustably clamped against movement relative to the lug 13 by a clamp nut 14ª. Projecting outwardly from the outer end of the spindle 14 substantially in longitudinal alinement with the spindle 2 is a gage rod 15 of predetermined length, the outer end of which is preferably flattened so as to have a straight transverse edge as shown at 16.

The outer end of this rod is adapted to rest on a plate or table 17 disposed parallel to the normal longitudinal position of the wheel 3, the table having a length and width sufficient to enable the rods to be maintained thereon when the wheel 3 is swung through its limit of travel both ways about its knuckle pin 18 as an axis.

The table is supported at one end on legs 19 and at the other end by a single vertically adjustable rod 20, which enables the table in the longitudinal plane of the wheel 3 to be adjusted to a correct horizontal level regardless of the floor from which it is supported. To enable the table to be accurately set to this position, a level 21 is mounted on the table in longitudinal alinement therewith. The height of the table from the floor is preferably about fifteen inches or approximately one-half the height of an average motor vehicle wheel. This height however has been chosen for convenience and does not need to be adhered to. When setting the table in position, said table being entirely independent of the structure clamped onto the wheel spindle, it is positioned so that the outer end of the rod 15 does not run off the table regardless of the position to which the wheel 3 may be turned. If desired vertical stops 22, set predetermined distances apart, may be mounted on the table to limit the arcuate movement of the rod 15 on said table.

In operation the wheel 3, having been jacked up, and the members 1 and 5 having been clamped onto the nut, the frame 9 is turned on the spindle 7 so that said frame is substantially horizontal. The table is then set up as preferably stated, and the wheel 3 is turned so that the rod 15 rests snugly on the table 17 against the rear stop 22. The spindle 14 is then firmly clamped to the lug 13 to prevent swinging movement of the rod relative to the frame 9. The wheel 3 is then swung in the opposite direction until the rod reaches the forward stop 22. If the pin 18 has a rearward slant from bottom to top, as is usual, the end 16 of the rod 15 will be above the table when said rod reaches the forward end of the same. This is because with the turning of the spindle from its rearward to its forward position, the outer end of the spindle 2 lifts with such turn, as will be evident, and the extent of such lift depends of course upon the slant of the pin. The rod having been turned to this forward position the operator measures the space between the table and the rod end. Comparing this measurement with a measurement which represents the proper slant of the pin, the operator will know instantly whether the pin has excessive or insufficient slant. This base or standard measurement has been arbitrarily determined by selecting the best engineering practice as to the slope of the knuckle pin as a basis, mounting the testing apparatus onto a wheel provided with such a pin and noting the measurement in inches between the table and the end of the rod after moving the latter in the manner above set forth.

This measurement of the pin being tested having been ascertained and found for instance to be greater than the base or standard measurement, the operator will know that the slant of the pin is excessive. He then adjusts the level 11 so as to be perfectly horizontal, and with the corresponding setting of the adjusting screw 12 as a starting point, turns said screw so that the level is tilted a predetermined distance in a direction opposite to the direction in which the pin 18 is to be tilted to move it to its proper position. If the axle is then twisted in the necessary direction until the level is again horizontal, the pin 18 will then be properly positioned or will have the proper slant. This is because the pitch of the screw 12 is such that when turned a certain definite number of turns one way or the other from its starting point, the resultant tilt of the level bears a predetermined relation to the offset tilt of the knuckle pin. This relationship of course is worked out beforehand. The operator has a chart or list of a number of measurements which may be obtained between the rod and the table during tests, both greater and less than the standard or base measurement, with the correct turns of the screw from its starting point necessary to set the level at a tilt such that twisting of the axle one way or the other will move the knuckle pin to its proper slant by the time the level is again horizontal. The axle twisting operation is done by any suitable means and the testing device is then removed from the spindle of one wheel and applied to the spindle of the other wheel to make a similar test.

The present device, while a unit in itself, preferably forms part of a complete equipment which includes my device for testing toe-in as set forth in my Patent No. 1,598,009, dated August 31st, 1926, and my device for testing wheel cant, Patent No. 1,601,261, dated September 28th, 1926.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for testing the caster of a knuckle pin, said pin being associated with a wheel spindle which projects laterally therefrom, said device including a gage rod to project laterally and outwardly from the spindle, means for detachably but rigidly securing one end of the rod in connection with the spindle, a horizontal table adapted to be arranged so that the other end of the rod when said rod is connected to the spindle will overhang the table at both limits of swinging movement of the rod with the turning of the pin, a level mounted on said connecting means and projecting at right angles to the rod, and means between said level and connecting means for tilting the level relative to said connecting means.

2. A device for testing the caster of a knuckle pin, said pin being associated with a wheel spindle which projects laterally therefrom, comprising clamping arms to be detachably connected to the spindle nut, a frame pivoted on one of said arms for swinging movement in a vertical plane longitudinally of said spindle, a gage rod projecting outwardly from said frame and adapted to be disposed in substantial horizontal alinement with the spindle, a horizontal table which the outer end of the rod is adapted to overhang at its limits of horizontal swinging movement with the turning of the knuckle pin, a level pivoted onto the frame on an axis parallel to the rod, said level extending at right angles to the rod, and means between the frame and level for altering the slope of the level relative to the frame.

3. A device for testing the caster of a knuckle pin, said pin being associated with a wheel spindle which projects laterally therefrom, said device including a gage rod to project laterally and outwardly from the spindle, means for detachably but rigidly securing one end of the rod in connection with the spindle, a horizontal table adapted to be arranged so that the other end of the rod when said rod is connected to the spindle will overhang the table at both limits of swinging movement of the rod with the turning of the pin, whereby if the knuckle pin has caster the other end of the rod will be higher from the table at one limit of its movement than at the other, such difference in height determining the relative caster of the knuckle pin, and means mounted in connection with the rod for enabling the completion of tilting adjustments if made to the pin to be visually evidenced without further testing being necessary.

4. A method of testing the caster of a front wheel knuckle pin by means of the wheel spindle consisting in turning the spindle substantially through its limits of movement, measuring the distance in vertical spacing between a point located some distance outwardly of the spindle and fixed relative thereto and a horizontal plane, at both limits of travel of the spindle; and comparing such measurement with a predetermined measurement which represents the correct caster of the pin.

5. A device for testing the caster of a knuckle pin, said pin being associated with a wheel spindle which projects laterally therefrom; said device including a gage rod to project laterally and outwardly from the spindle, means for detachably and rigidly securing one end of the rod in connection with the spindle, and a horizontal table adapted to be arranged so that the other end of the rod, when said rod is connected to the spindle, will overhang the table at both limits of swinging movement of the rod with the turning of the pin.

6. A device for testing the caster of a knuckle pin, said pin being associated with a wheel spindle which projects laterally therefrom; said device comprising a frame, clamping arms provided with said frame for rigid and detachable connection with the nut of the spindle, a gage rod extending longitudinally of said spindle, and pivoted at one end onto the frame for swinging movement in a vertical plane, means for holding said rod against such swinging movement, and a horizontal table arranged so that the other end of the rod will overhang the table at the limits of horizontal swinging movement of the rod with the turning of the knuckle pin.

In testimony whereof I affix my signature.

GEORGE W. PRATHER.